United States Patent [19]
Kind

[11] 3,984,741
[45] Oct. 5, 1976

[54] METHOD AND APPARATUS FOR CURRENT REGULATION OF A CIRCULATING-CURRENTFREE RECTIFIER CIRCUIT ARRANGEMENT

[75] Inventor: Burckart Kind, Schwerzenbach, Switzerland

[73] Assignee: Contraves Antriebstechnik AG, Regensdorf, Switzerland

[22] Filed: Jan. 13, 1975

[21] Appl. No.: 540,519

[30] Foreign Application Priority Data
Feb. 7, 1974 Switzerland.......................... 1684/74

[52] U.S. Cl. ............................................. 318/293
[51] Int. Cl.² ....................................... H02P 1/22
[58] Field of Search.................... 318/291, 293, 257; 321/5, 13, 27

[56] References Cited
UNITED STATES PATENTS
3,431,479  3/1969  Joslyn ............................. 318/293 X
3,541,426  11/1970  Joslyn et al. .................... 318/293 X Primary Examiner—Gene Z. Rubinson
Attorney, Agent, or Firm—Werner W. Kleeman

[57] ABSTRACT

A method of and apparatus for the current regulation of a circulating-currentfree or loop-currentfree rectifier circuit arrangement, especially for an anti-parallel circuit, wherein the operating point for firing a rectifier arrangement after switching is continuously controlled or readjusted. The firing angle-control voltage of the non-fired rectifier arrangement is derived from the firing angle-control voltage of the fired rectifier arrangement and the course as a function of time of the armature current of a motor constituting the load.

6 Claims, 2 Drawing Figures

METHOD AND APPARATUS FOR CURRENT REGULATION OF A CIRCULATING-CURRENTFREE RECTIFIER CIRCUIT ARRANGEMENT

BACKGROUND OF THE INVENTION

The present invention relates to a new and improved method of regulating the current of a circulating-currentfree or loop-currentfree rectifier circuit arrangement, especially in an anti-parallel circuit arrangement, wherein the operating point, needed after switching from one rectifier arrangement to the other rectifier arrangement, for igniting the latter is continuously followed-up or readjusted, and this invention also pertains to a new and improved apparatus for the performance of the aforesaid method aspects.

There are already known to the art current rectifier drives for a circulating-currentfree anti-parallel circuit arrangement and, for instance, the regulation behavior thereof has been described in considerable detail in the following German language publication:

Technische Mitteilungen AEG-Telefunken 60 (1970) 6, Entitled: "Die Regeldynamik von Stromrichterantrieben in kreisstromfreier Gegenparallelschaltung", authored by Arne Buxbaum.

This publication in its summary states that the simplest circulating-currentfree anti-parallel circuit, the circuit utilizing switching of the pulses, possesses relatively poor regulation dynamics. It is only possible to obtain a limited improvement by means of a regulation control. This circuit and its shortcomings have been listed in the aforementioned publication under point 3. As therein stated a switching-current rectifier is equipped with a regulation control having two pulse control devices, two current regulators and an additional regulation control or adjustment means. The regulation adjustment means insures that the current regulator of the current rectifier arrangement which is not in an active state will be readjusted as a function of the electromotive force (EMF) of the motor in such a way that after switching to such current rectifier arrangement the output voltage of the regulator corresponds to the required control of the current rectifier. With this arrangement the prolonged currentless intervals or pauses and the prolonged regulation times following the switching operation can be avoided. There only remains the null-time brought about by the required waiting time of the switching stage. Owing to the necessary limitations this circuit arrangement has not proven to be satisfactory in practice.

Moreover, from the subsequent explanations of the shortcomings described in this publication it can be recognized that the regulation control only operates faultlessly in the non-interrupted or gapless current range. With increased expenditure it is only partially possible to obtain satisfactory functioning in the interrupted or gap current range.

SUMMARY OF THE INVENTION

It is a primary object of the present invention to provide an improved method of and apparatus for the current regulation of a circulating-currentfree rectifier circuit arrangement.

Another object of the invention aims at avoiding the explained drawbacks, especially the limitations with respect to the non-interrupted or gapless current range.

Now in order to implement these and still further objects of the invention, the method aspects thereof contemplate deriving from the firing angle-control voltage of the fired rectifier arrangement and the time-course of the armature current the firing angle-control voltage of the non-fired rectifier arrangement. The firing angle-control voltages are preferably derived from the output voltage of a current regulator and a voltage which is proportional to the gap duration of the pulses of the actual value of the armature current.

Not only is the invention concerned with the aforementioned method aspects but also relates, as previously mentioned, to apparatus for the performance thereof, and according to the invention such apparatus is manifested by the features that the output voltage of a current regulator is delivered to a respective first input of a first summation amplifier and via an inverting amplifier to a second summation amplifier, that the non-smoothed actual value of the armature current is delivered to a circuit for forming an output voltage which is proportional to the gap duration of the pulses of the actual value of the armature current, and such output voltage is respectively delivered to each second input of both aforesaid summation amplifiers.

It is preferable if this last-mentioned circuit contains a series arrangement of a threshold value switch for forming a squarewave voltage from the gap duration of the pulses of the actual value of the armature current, a smoothing element for forming the means or average value from such squarewave voltage, and an amplifier circuit for converting the mean value into a proportional part or fraction thereof. Furthermore, the threshold value switch can be advantageously provided for forming a squarewave voltage of predetermined amplitude during the duration of the pulses of the actual value of the armature current, and the amplifier circuit can advantageously comprise a first amplifier for inverting the mean value and a second amplifier for the summation of the inverted mean value with a second value +1 and for inverting and dividing the sum by 3.

DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
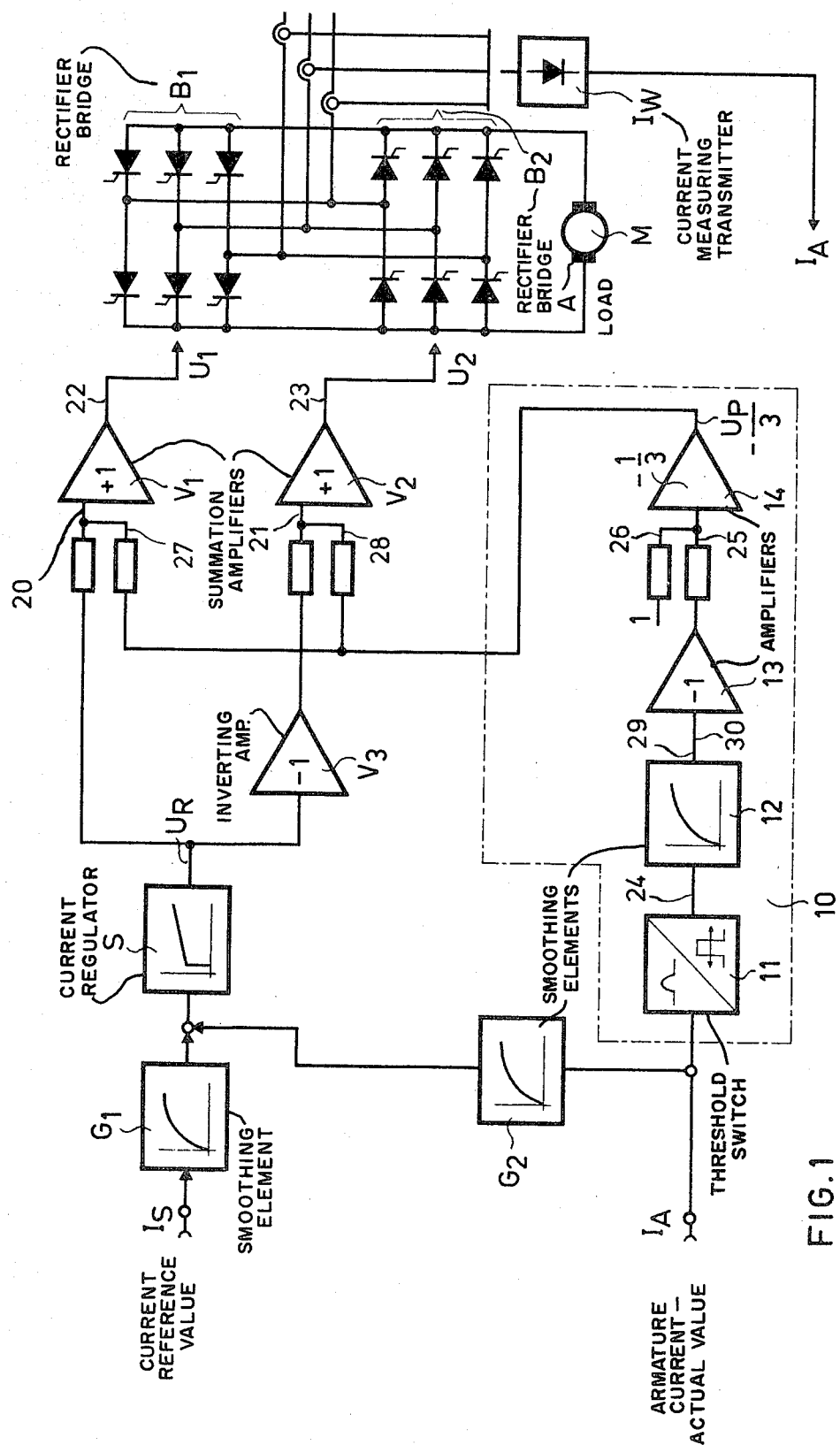
FIG. 1 is a block circuit diagram of a current regulation for a circulating-currentfree or loop-currentfree anti-parallel circuit.

Describing now the drawings, and referring particularly to FIG. 1, there is disclosed a circulating-currentfree or loop-currentfree anti-parallel circuit arrangement of two thyristor rectifier groups in a three-phase bridge circuit arrangement or configuration which act upon a load, here shown for instance as the armature A of a direct-current motor M. In each case only one of the two current rectifier groups i.e. rectifier bridges $B_1$ and $B_2$ conducts current and the other rectifier bridge remains blocked. In order to reverse the direction of current flow through the armature A of the DC-motor M it is first of all necessary to reduce the current in the armature to null, to block the rectifier bridge arrangement which previously was in its conducting mode, and then after a safety time interval to ignite or fire the other rectifier bridge arrangement. Circuitry and equipment for the firing and blocking respectively of rectifier bridge arrangements as well as for their switching are well known in this particular field of technology and thus as a matter of convenience in illustration have not been shown in FIG. 1. Equally not shown is the conventional regulating circuit employed in the art for the rotational speed of the motor since such is equally unnecessary to the understanding of the basic concepts of this development. The current regulating circuit contains a PI-regulating amplifier S, possibly additionally with follow-up or readjustment of the integration time-constants in the current gap range, which serves as the current regulator S. There is delivered to this current regulator S a current-reference value $I_S$ via a smoothing element $G_1$ and the armature current-actual value $I_A$ via a further smoothing element $G_2$, and which armature current-actual value $I_A$ constitutes a magnitude delivered by a current measuring transmitter IW and is proportional to the armature current of the load.

The output voltage $U_R$ of the current regulator S is delivered in the form of an adjustment magnitude respectively to a first input 20 of a first summation amplifier $V_1$ and via an inverting amplifier $V_3$ to a first input 21 of a second summation amplifier $V_2$. The outputs 22 and 23 of both summation amplifiers $V_1$ and $V_2$ are available as firing angle-control voltages $U_1$ and $U_2$ for the not particularly illustrated firing or ignition devices for the current rectifier bridges $B_1$ and $B_2$ respectively.

With the foregoing in mind the inventive method will now be discussed in greater detail. In order to obtain a rapid regulation for all permissible rotational speeds of the motor M it is important that the firing angle of the newly ignited or fired bridge arrangement at the start of the firing operation is located with respect to the phase of the network supply voltage such that, on the one hand, the conducting of current begins immediately and, on the other hand, there are avoided uncontrolled current surges. In other words, the firing angle-control voltage of the non-fired rectifier bridge arrangement must be readjusted or controlled such that the terminal voltage of such bridge arrangement, which is present upon firing of this bridge arrangement, corresponds to the terminal voltage of the rotating armature.

For the purpose of the following explanation there is designated for instance the firing angle of the bridge arrangement $B_1$ in the case of non-interrupted or gapless bridge current by the symbol $\phi_1$. Since the regulation amplification or gain in the non-interrupted or gapless current range is very large, the value $\phi_1$ in this range can be considered to be constant for a fixed rotational speed $\omega$, wherein $\phi_1 = \phi_1(\omega)$. If with fixed rotational speed $\omega$ the current is reduced past the gap boundary into the interrupted current range, then firing occurs at a later point in time. The firing angle of the bridge arrangement $B_1$ in the interrupted current range is designated as a matter of convenience by the symbol $\chi_1$ and the momentary value of such displacement or shift of the firing angle of the bridge arrangement $B_1$ relative to $\phi_1$ is designated by the symbol $\Psi_1$. Further, the duration of a period or cycle of the network voltage is designated by reference character T and the total duration of the null gaps of the bridge current during a period of the network voltage is designated by $t_p$. With good approximation it can be assumed that the value $\Psi_1$ is firstly corresponds to the ratio of $t_{p/T}$ and secondly for all rotational speeds attains the maximum value of 30 electrical degrees with a current value of null. With adequate accuracy the following equation is valid:

Equation (1)    $\Psi_1 = \Psi_1(t_p) = (\pi/6) \cdot (t_p/T)$

According to this equation in the case of non-interrupted or gapless current the firing angle shift or displacement $\Psi_1 = 0$ and for complete gaps i.e. armature current amounting to null, $\Psi_1 = 30$ electrical degrees. Generally, the firing angle of the bridge arrangement $B_1$ which now is in its active state can be expressed by the following:

Equation (2)    $\chi_1 = \phi_1(\omega) - \Psi_1(t_p)$

If $\phi = 0$ with the motor stationary, i.e. with the bridge voltage null standardized for non-gapless or uninterrupted current, then for both bridges with the rotational speed $\omega$ and bridge current with gap duration $t_p$ there are valid the equations (3) to (6) with the associated angular ranges, to wit:

Equation (3)    $\phi(\omega) = \phi_1(\omega) = -\phi_2(\omega)$, wherein $-(\pi/2) \le \phi \le (\pi/2)$ Equation (4)    $\Psi(t_p) = \Psi_1(t_p) = \Psi_2(t_p)$, wherein $0 \le \Psi \le (\pi/2)$ Equation (5)    $\chi_1 = \phi(\omega) - \Psi(t_p)$,
Equation (6)    $\chi_2 = \phi(\omega) - \Psi(t_p)$ wherein $-(\pi/2) \le \chi \le (\pi/2)$ If there are used firing stages possessing linear characteristic, then from the firing angles to the firing angle-control voltages, for instance for the bridge $B_1$, it is possible to derive the following $\chi_1 = k \cdot U_1$. If $k = (\pi/2)$ then the firing angle-control voltages vary in the range of $-1$ to $+1$. To determine the shift of the firing angle and the firing displacement angle $\Psi$ when working in the interrupted current range the mangitude $t_p/T$, which corresponds to the course as a function of time of the armature current-actual value $I_A$, can be converted into a proportional voltage $U_p$. The firing angle-control voltages $U_1$ and $U_2$ now can be derived according to the following equations (7) to (10) from the adjustment magnitude $U_R$ of the current regulator S and the voltage $U_p$ which is proportional to the time-course of the armature current.

Equation (7)    $U_R \approx \phi(\omega)$

Equation (8)    $(U_p/3) \approx \Psi(t_p)$

Equation (9)    $U_1 = U_R - (U_p/3)$

Equation (10)    $U_2 = -U_R - (U_p/3)$

If equations (9) and (10) are compared with equations (5) and (6), then it will be apparent that in the region of the interrupted current the firing angle-control voltages are not only determined by the output voltage $U_R$ of the current regulator S, rather reduced by the voltage value $U_p/3$. This reduction only occurs in the interrupted current range and as far as its value is concerned corresponds to the displacement or shift of the firing angle Ψ, which is derived from the course as a function of time of the armature current.

According to the showing of FIG. 1 the device 10 for determining the firing displacement angle Ψ of the fired bridge arrangement contains a series arrangement of a threshold value switch 11, a smoothing element 12 and both of the amplifiers 13 and 14. This circuit branch is connected in parallel with the current regulator S. In the threshold value switch 11 its input signal, the non-smoothed armature current-actual value $I_A$, is transformed for instance such that there appears at the output 24 a squarewave voltage pulse of predetermined amplitude (value 1) for the duration of each current pulse. In the smoothing element 12 there is formed the average or mean value of this squarewave function and delivered via the inverting amplifier 13 to the first input 25 of a summation amplifier 14 for the summation formation with a second input 26 possessing the value +1, divided by 3 and inverted. The resultant output value $-U_p/3$ is now delivered to the respective second inputs 27 and 28 of both summation amplifiers $V_1$ and $V_2$ in which, in conjunction with the adjustment magnitude $U_R$ delivered by the current regulator S, there are formed the firing angle-control voltages $U_1$ and $U_2$ according to the equations (9) and (10).

There will hereinafter now be explained the mode of operation of the current regulation according to the arrangement of FIG. 1 for the non-interrupted and the interrupted armature current range. In the non-interrupted range the output of the threshold value switch 11 and thus the smoothing element 12 receives the value +1 which by inverting in the amplifier 13 assumes the value −1. By delivering the value +1, for reasons to be explained more fully hereinafter, at the second input 26 to the summation amplifier 14 the sum of both inputs becomes null and thus also its output. This means that the control voltages $U_1$ and $U_2$ are determined by the adjustment magnitude $U_R$ via the amplifiers $V_1$ and $V_2$ and which adjustment magnitude is delivered by means of the PI-regulation amplifier S.

Figure 2:
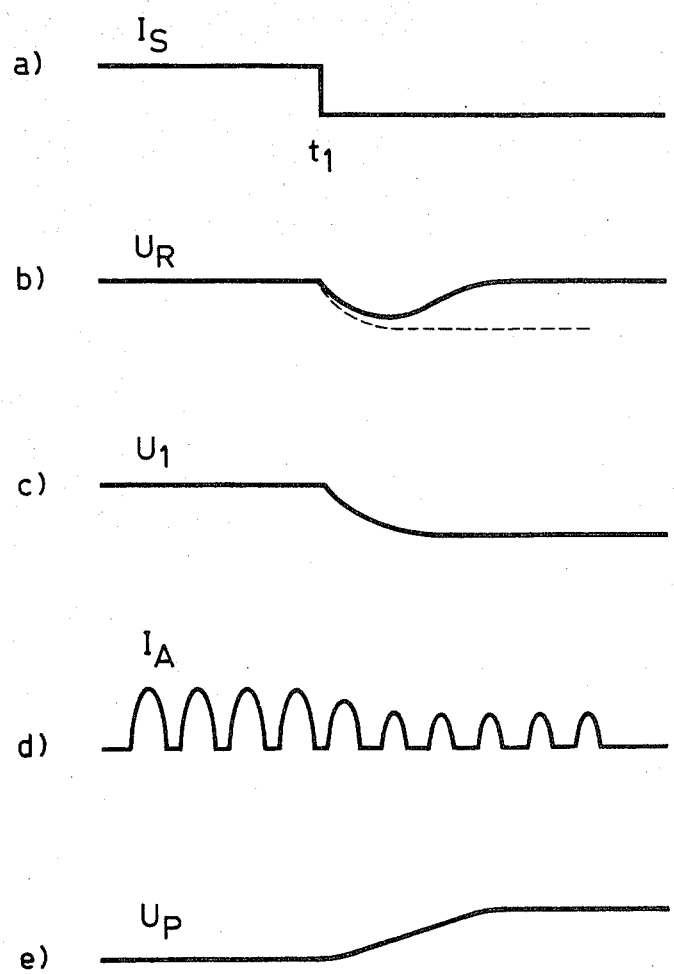
FIG. 2 illustrates different curves or graphs portraying the behavior of the current- and voltage values during a change in the actual value of the armature current of the load.

The regulation behavior in the range of the interrupted current for a change in the reference value brought about by the rotational speed regulator has been shown in FIG. 2. If the value of the reference current $I_S$ changes in a step-like manner at the point in time $t_1$ according to the curve (a), then without considering the action of the circuit 10 the regulator S adjusts the adjustment magnitude $U_R$ in accordance with the broken line of curve (b). Due to the dropping of the adjustment magnitude $U_R$ there is also reduced the value of the firing angle-control voltage, for instance $U_1$, according to the curve (c) and the current value $I_A$ is reduced and the gap duration $t_p$ is increased according to the curve (d). This brings about a reduction of the value at the output 29 of the smoothing element 12. This value is inverted in the amplifier 13 and in the subsequent summation amplifier 14 subtracted from the value +1 of the second input 26, inverted and divided by 3, so that there results an increase of $U_p$ according to the curve (e) i.e. there results the value $-U_p/3$. Due to the displacement of the firing angle via the regulation circuit the adjustment magnitude $U_R$ is now returned to approximately the value prior to the change in the reference value.

During each reversal of the polarity of the armature current during passage of the current through the value null, both rectifier bridge arrangements are turned-off for the duration of a safety time period in order to prevent a short-circuit in the rectifier circuit. During this safety time period, which lasts for instance for 1 msec., preferably both of the inputs, i.e. the reference current value and the actual current value of the regulator S are set to null. In this way there is prevented that the regulator output, the adjustment magnitude $U_R$, changes during the reversal in polarity. Furthermore, there is advantageously delivered to the amplifier 14 a voltage with the value +1 for summation with the value delivered by the amplifier 13 and during the reversal in polarity the input 30 of the amplifier 13 is set to null. In this way there is achieved the result that the armature current after each reversal in polarity, due to the firing angle shift to the value − ⅓, starts at the value null. Advantageously, the time-constant of the switching circuit 10 i.e. the smoothing element 12 is set so as not to be smaller than the time-delay constant of the closed current regulation circuit.

A circulating-currentfree or loop-currentfree antiparallel circuit according to FIG. 1 also operates in the interrupted current range and there also in a faultless manner with small currents without any direct-current chokes in the motor circuit. In the event that high requirements are placed upon the regulation dynamics the use of an adaptive regulator in lieu of the PI-regulator is justified.

The described switching circuit 10 or an equivalent circuit can be easily realized by using conventional components. The time-constants of the smoothing elements $G_1$, $G_2$ and 12 can, for instance, amount to the values 4, 1 and 10 msec. It is also however conceivable to obtain for the interrupted current range a shift in the firing angle by another circuit which as a function of the time-course of the armature current $I_A$ delivers a value for the firing shift or displacement angle. If the output of an equivalent circuit for the firing angle displacement assumes a positive value, then according to the equations (9) and (10) the polarity of the summation amplifier element must be correspondingly adapted. The proposed current regulation is not limited to applications with linear characteristic of the firing control units, rather can be employed for all useful, preferably symmetrical firing angle control-characteristics. Additionally, it is conceivable to arrange in circuit after the adjustment magnitude of the control regulator a function former for linearization of the direct-current-control voltage-characteristic.

While there is shown and described present preferred embodiments of the invention, it is to be distinctly understood that the invention is not limited thereto, but may be otherwise variously embodied and practiced within the scope of the following claims. Accordingly,

What is claimed is:

1. An apparatus for the current regulation of a circulating-currentfree rectifier circuit arrangement operating upon a load, comprising circuitry incorporating a first rectifier bridge circuit and a second rectifier bridge circuit, a load defined by a motor having an armature electrically connected with said first and second rectifier bridge circuits, a current regulator, a first summation amplifier having a first input in circuit with said current regulator, a second summation amplifier having a first input in circuit with said current regulator, an inverting amplifier, said current regulator having an output at which there appears an output voltage which is delivered to said first input of the first summation amplifier and via said inverting amplifier to said first input of the second summation amplifier, circuit means for forming an output voltage proportional to the gap duration of the pulses of the actual value of the armature current, said circuit means receiving as an input the non-smoothed armature current-actual value, and said output voltage being delivered to a respective second input of both said summation amplifiers.

2. The apparatus as defined in claim 1, wherein said output voltage forming-circuit means contains a series arrangement of a threshold value switch for forming a squarewave voltage from the gap duration of the pulses of the actual value of the armature current, a smoothing element for forming the mean value from said squarewave voltage, and an amplifier circuit for converting the mean value into a proportional part thereof.

3. The apparatus as defined in claim 2, wherein the threshold value switch serves for forming a squarewave voltage of predetermined amplitude during the duration of the pulses of the actual value of the armature current, said amplifier circuit including a first amplifier for inverting the mean value and a second amplifier for the summation of the inverted mean value with a second value +1 and for the inversion and division by 3 of the sum.

4. The apparatus as defined in claim 3, wherein the inverting amplifier and both summation amplifiers are arranged in circuit such that through the respective sum formation of both input voltages of both summation amplifiers there is produced the firing angle-control voltages according to the equations $U_1 = U_R - (U_p/3)$ and $U_2 = U_R - (U_p/3)$, wherein $U_1$ and $U_2$ represent the respective firing angle-control voltages, $U_R$ represents the output voltage of the current regulator, and $U_p/3$ represents the voltage proportional to the gap duration of the pulses of the actual value of the armature current.

5. A method of regulating the supply current of a DC-load with the aid of two circulating-currentfree, anti-parallel connected rectifier arrangements which are ignited and extinguished in alternate sequence to one another, wherein for the rectifier arrangements there is generated a respective firing angle-adjustment magnitude as a function of a control deviation constituted by the momentary difference between a reference value and the actual value of the load current to be regulated, the current-pulses of the non-smoothed load current in the uninterrupted operating state merging with one another without any gaps and in the interrupted operating state being separated from one another by relatively large gaps, the improvement comprising the steps of: generating a firing angle-correction magnitude corresponding to the effective gap size of the non-smoothed load current, subtracting the thus generated firing angle-correction magnitude both from a base value of the firing angle-adjustment magnitude generated in a regulation circuit and from the inverse value thereof, and thereby obtaining corrected firing angle-adjustment magnitudes with interrupted load currents for the one rectifier arrangement and the other rectifier arrangement in accordance with the gap size.

6. The method as defined in claim 5, including the step of forming the firing angle-correction magnitude, such that with uninterrupted load current the firing angle-correction magnitude assumes the value null and with interrupted load current such firing angle-correction magnitude increases proportional to the effective gap size up to a predetermined unit-terminal value for maximum interrupted load current.

* * * * *